UNITED STATES PATENT OFFICE.

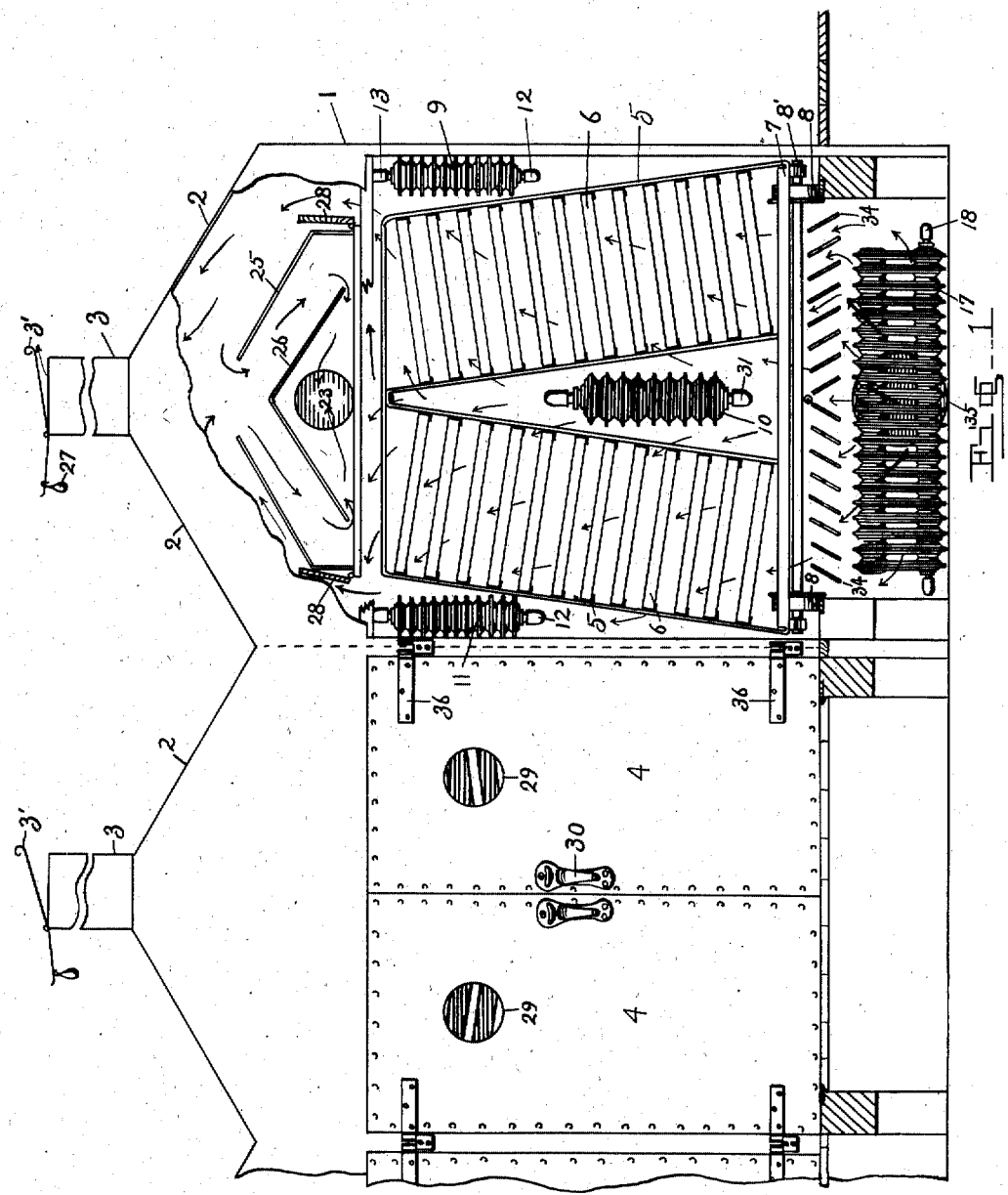

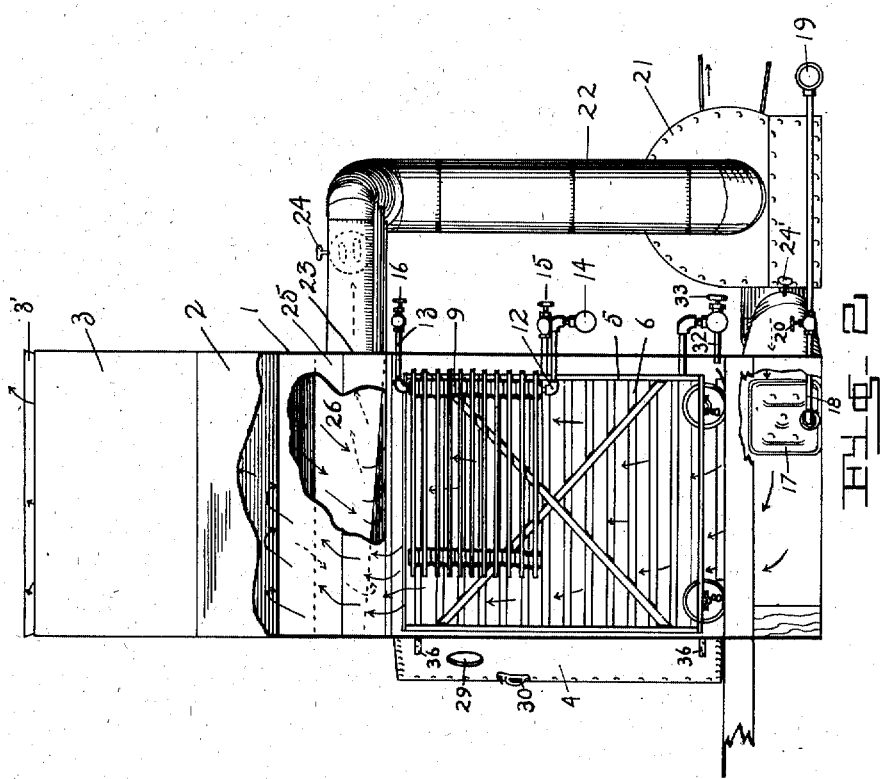

OTTO Q. BECKWORTH AND OLIVER J. HOBSON, OF SEATTLE, WASHINGTON.

APPARATUS AND PROCESS FOR DRYING.

1,228,283.     Specification of Letters Patent.     Patented May 29, 1917.

Application filed May 11, 1915. Serial No. 27,444.

*To all whom it may concern:*

Be it known that we, OTTO Q. BECKWORTH and OLIVER J. HOBSON, citizens of the United States, residing at Seattle, in the county of King and State of Washington, have invented certain new and useful Improvements in Apparatus and Processes for Drying; and we do hereby declare the following to be a full, clear, and exact description of the invention, such as will enable others skilled in the art to which it appertains to make and use the same.

This invention relates to a process and apparatus for drying fruits, vegetables, meats and other material, for preserving the natural or essential oils, flavors and food values of the articles without breaking down the natural cell structure of the material.

To this end the invention consists of a process and apparatus whereby the fruit or other material to be dried is first heated through by the application of moist heat but without materially cooking the material, the heat of said material being increased in such manner as to bring all parts of the material to the proper condition conducive to the vaporization of the moisture throughout the substance of the material being dried, or to produce uniform internal heat which will facilitate the movement, through capillarity, of the moisture to the surface as soon as the humidity of the surrounding air is reduced. The surrounding air is kept warm and humid, the humidity being gradually reduced by allowing a portion to escape during the process. This is accomplished by special means to be described.

The application of heat prior to the evaporation of water from the material is to condition the material for the subsequent vaporization of the interior moisture and start a gentle outward pressure to facilitate capillarity toward the surface. It is desirable to keep the surface temperature quite low with certain delicate fruits and vegetables so as not to disturb the cell structure or break down the cell walls of the material to be dried, pending vaporization of the moisture in said material. Certain substances require a loosening of their structure in order to promote capillarity toward the surface, but a long continued high temperature of said loosening means at first would produce an undesirable chemical change and tend to cook the substance. By means of an inlet pipe steam may be introduced to produce the desired heat and the desired humidity at the same time.

An important feature of the apparatus consists in improved means for separating the vapor from the circulating air so that the material may be dried as desired.

In the drawings,

Figure 1 is a view partly in front elevation and partly broken away showing a portion of a battery of drying chambers constructed in accordance with the invention.

Fig. 2 is a view of the device in elevation, partly broken away, the view being taken from the side of the structure.

The outer walls of the drying chamber are shown as 1, this chamber being provided with sloping roof members 2, a ventilating shaft 3, and a damper door 3′ suitably fixed to the shaft, and controlled by shifting a weight 27. In the upper portion of the drying chamber is a series of baffle plates 25, 26 and doors 28, for causing the heated vapor to move in different directions shown by the arrows, the vapor tending to accumulate in ventilator shaft 3. A fan of any well-known type may be caused to revolve within the drum 21.

The fruit or other material is placed on trays 6 carried by frames 5. These frames 5 are carried by a lower horizontal framework 7 supported on wheels 8, the journal bearings being shown at 8′. Within the chamber is a series of heating devices of the common radiating type, as 9, 10, 11 and 17, so arranged that the truck and its framework and trays may be moved in or out of the chamber without disturbing the position of the heaters, and the material on said trays be exposed to the energy radiating therefrom.

The heat is supplied by steam introduced by means of pipes 12, 13, 18, 31, 14 and 19, and controlled by valves 15, 16, 20 and 23. It is found that radiant energy direct from the heaters has greater penetrating power for dehydrating the material than heat of convection, and produces a better effect by vaporizing the interior moisture of the articles to be dried.

After the fruit or material in the chamber has been subjected to the moist heating process, it is in condition for discharging vapor, and sufficient additional heat is supplied to said material from the radiators, or part of them, to continue the removal of water from the material. The vapor as it is removed from the material, being of less specific gravity than the air of the same temperature, is carried to the top of the chamber by the circulating air and passes upwardly into the ventilating shaft 3, and the damper 3' is so arranged as to allow the escape of varying portions of the vapor. When the fruit or other material is placed in the compartment, it is not necessary to allow any of the moisture to escape from the apparatus until the air becomes quite saturated with moisture. When the material is in proper condition as described, the fan is set in motion, thereby causing the vapor beneath baffle plate 26 to enter the mouth 23 of the tube 22 and to be forced down beneath the lowest portions of the fruit and there discharged through the orifice 35 behind radiator 17 and distributed by lower baffle plates 34, thence rising among the material; these means permitting of the regulation of the speed of evaporation by the amount of heat applied to the material and the amount of moisture expelled from the apparatus. As it is desirable that a considerable portion of the moisture from the material shall be held in the circulating air at the beginning of the process, the damper 3' is preferably arranged to allow only the desired amount of moisture to escape, and the moisture left in the circulating air prevents the too rapid removal of the moisture from the surface as the dehydrating process continues. Thus the required amount of vapor is repeatedly drawn down and allowed to pass among the drying material. In case insufficient moisture should pass from the material in the process to keep the vapor of desired density, necessary steam or other vapor may be introduced through the pipe 32. Dampers 24 and 24' in the duct 22 aid in the regulation of the passage of vapor. Doors 4, 4 in front of the chamber, through which the truck and drying trays with material may be removed, are provided with suitable hinges 36, and latches 30, and glass-covered openings 29 for observation. Hygrometers and thermometers may be placed so as to be visible through these openings or elsewhere, to show the humidity and temperature of the circulating air.

Rapidly moving currents of air at comparatively moderate temperature are sufficient to carry away the moisture that is brought to the surface of the material by capillarity, and capillarity is hastened by the circulating warm air and the radiant energy acting together. When the circulating air is too dry the capillarity is greatly retarded by the rapid hardening and drying of the surface, and in order to properly preserve the material it is necessary to continue the process long enough to vaporize and remove the interior moisture. If the outer parts become hardened too soon the structure will be ruptured as the interior moisture is forced outwardly. When the cell walls are broken down the natural oils and flavors of the material escape and cannot be replaced. The moist heat keeps the walls of the outer cells in such condition that the removal of the moisture from the innermost cells will be accelerated by the capillary attraction of the moisture in the circulating medium without rupture of the cell walls due to a too rapid drying and shrinking of the outer tissues.

Owing to the great difference in specific gravity of water vapor at even slight differences of temperature, it is easy by this process and apparatus to separate out the excess moisture and allow the same to pass out of the machine, and to maintain a medium of the desired temperature and humidity and cause the same to circulate among the material until the proper state of dryness has been attained.

Having described our invention what we claim is:

1. A process for dehydrating fruits and vegetables without disturbing the cell structure or causing harmful chemical changes, which consists in first applying thereto heated vapor, then subjecting the material to the effect of radiant heat from numerous sources about the walls of a closed chamber while circulating a moist drying medium at a controlled temperature around the material being treated, said radiant heat being supplied to said sources from outside said chamber, removing the moisture from the surface of the material and from the surrounding air by circulating the vapor-laden air and allowing the moister air to escape from the circulating medium, and drying out the remaining moisture from the material by the simultaneous application of said radiant heat and dry warm air.

2. The herein described process for treating fruits and vegetables consisting in first subjecting the material in a closed compartment to the heat of convection, then subjecting it to gradually increasing additional heat from radiating means located adjacent to the walls of the compartment and energized from without said compartment, circulating the medium at a lower temperature than that of the material and simultaneously gradually reducing the humidity within said chamber.

3. The herein described process for treating fruits and vegetables consisting first in subjecting the material in a closed compartment to the heat of convection and then to additional heat from radiating means located adjacent to the walls of the compartment and energized from without said compartment, simultaneously separating the drier portions of air from the moister portions in an upper compartment, eliminating the moister portions and returning the drier portions of the air to a point below the material being treated for equal distribution and renewed contact with the material being treated.

4. The hereindescribed process of treating fruits and vegetables consisting of first subjecting them in a closed compartment to moist heat at a temperature less than that required to cook them, then subjecting them to upwardly flowing currents of air in conjunction with radiant heat of sufficient volume and temperature to liberate the inherent moisture in the materials, and maintaining this step, and while the medium within the said chamber is approaching saturation, drawing off the vapors from a point above the material being treated and setting up a forced circulation of warm air below that point.

5. A process for de-hydrating material comprising fruits, vegetables and the like, which consists in applying thereto a moist drying medium and circulating said medium around said material to moisten the surface thereof and heat the same throughout by convection, in subjecting said material to radiant heat from a source which is independent of said moist drying medium to supply additional heat thereto, and simultaneously with said additional supply continuously circulating around said material a drying medium the vapor contents whereof are under control, and whereof the temperature is under control, in continuously removing said circulating medium from said material, in discharging some thereof and returning the remainder and again circulating it around said material, and in subsequently applying de-hydrated warm air simultaneously with the continued application of said radiant heat to said material.

6. The process of treating material, such as fruits, vegetables and the like, which includes disposing said material in a compartment to be acted upon by a fluid consisting of air and vapor, introducing said air and vapor to said compartment and discharging some of said vapor from said compartment, controlling the temperature of the fluid in said compartment, and independently of the fluid in said compartment obtaining radiant heat therein, whereby the temperature of the material in said compartment is determined by the temperature of said fluid and said radiant heat.

7. A dehydrating apparatus comprising a chamber, in combination with means to introduce material to and remove it from said chamber, means to admit air and vapor into said chamber, means to control the temperature of said air and vapor, means to produce a flow of said air and vapor through said chamber and among said material to moisten the surface of said material and heat the same throughout, but not to cook it, means to control the flow and discharge of vapor from said chamber, and means positioned in said chamber to apply radiant heat to said material from a source of supply not positioned therein, and thereby obtain heat in said material additional to said first named heat.

8. In an apparatus for treating fruits, vegetables, and the like, a heating and drying chamber, radiators disposed about the walls of the chamber, means positioned outside said chamber to supply heat to said means for causing the air and vapor within the chamber to circulate therein from below upwardly, and means for controlling the amount of heat and humidity in the circulating medium and means for controlling the humidity of the circulating medium in said chamber.

9. In an apparatus for treating fruits, vegetables, and the like, a drying chamber in combination with a truck movable into and out of the same, means for supplying steam to the interior of the chamber, radiators disposed within said chamber out of the path of movement of the truck, a duct having its ends communicating with the chamber near the upper and lower portions thereof, means within the duct for causing circulation therein and upwardly through the chamber, baffle plates above the upper end of the duct, a ventilating shaft above the upper baffle, and means for controlling the flow of air through the shaft.

10. In an apparatus for treating fruits, vegetables and the like, the combination with a track and a truck thereon including a frame and trays for supporting the material to be treated, of a drying chamber inclosing a portion of the track and having a moisture outlet at its upper end, means for introducing heated moist air, radiators within the chamber out of the path of the trays on the truck, means for supplying varying degrees of heat to the radiators, movable baffle plates at the lower end of the chamber and fixed baffles above the several radiators and above said frame, and means for withdrawing air from the upper portion of the chamber beneath the fixed baffles and returning it to the lower portion of the chamber and directing it against one of the radiators there located.

11. Means for holding fruit, vegetables or other material to be dried and with spaces about the material for circulation of moisture-laden air, baffle plates for retarding the velocity of the circulating vapor-laden air, and an exhaust device to draw off the heavier warm air and return it to the drying chamber; a vent stack provided with suitable dampers through which the lighter vapors gravitate upwardly out of the machine; numerous sources of radiant heat disposed about the walls of the drying compartment.

In testimony whereof we affix our signatures in presence of two witnesses.

OTTO Q. BECKWORTH.
OLIVER J. HOBSON.

Witnesses:
   G. WARD KEMP,
   C. C. PHILLIPS.

It is hereby certified that in Letters Patent No. 1,228,283, granted May 29, 1917, upon the application of Otto Q. Beckworth and Oliver J. Hobson, of Seattle, Washington, for an improvement in "Apparatus and Processes for Drying," an error appears in the printed specification requiring correction as follows: Page 3, line 84, claim 8, after the word "said," second occurrence, insert the word *radiators*, and that the said Letters Patent should be read with this correction therein that the same may conform to the record of the case in the Patent Office.

Signed and sealed this 3rd day of July, A. D., 1917.

[SEAL.]

F. W. H. CLAY,
*Acting Commissioner of Patents.*

Cl. 34—39.